United States Patent
Zeng et al.

(10) Patent No.: US 11,134,231 B2
(45) Date of Patent: Sep. 28, 2021

(54) LIGHT CONTROL DEVICE

(71) Applicant: HUAZHONG UNIVERSITY OF SCIENCE AND TECHNOLOGY, Hubei (CN)

(72) Inventors: Shaoqun Zeng, Hubei (CN); Qinglei Hu, Hubei (CN); Xiaohua Lv, Hubei (CN); Qingming Luo, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 95 days.

(21) Appl. No.: 16/199,233

(22) Filed: Nov. 26, 2018

(65) Prior Publication Data
US 2020/0137365 A1    Apr. 30, 2020

(30) Foreign Application Priority Data
Oct. 31, 2018    (CN) .......................... 201811281627.3

(51) Int. Cl.
*H04N 9/31*    (2006.01)
(52) U.S. Cl.
CPC ......... *H04N 9/3155* (2013.01); *H04N 9/3197* (2013.01)

(58) Field of Classification Search
CPC .......................... H04N 9/3155; H04N 9/3197
See application file for complete search history.

(56) References Cited

U.S. PATENT DOCUMENTS

2010/0328759 A1*  12/2010  Kirkby ................... G02F 1/332
                                                                359/310
2019/0086598 A1*  3/2019  Futterer ............... G02B 6/0068

FOREIGN PATENT DOCUMENTS

CN          104849837 A  *  8/2015

* cited by examiner

*Primary Examiner* — Michelle M Iacoletti
*Assistant Examiner* — Danell L Owens
(74) *Attorney, Agent, or Firm* — JCIPRNET

(57) ABSTRACT

The light control device includes a light modulation module and a dispersion compensation module. The light modulation module is used for modulating an incident light field to obtain a target diffraction light field. The dispersion compensation module is used for performing dispersion compensation on the target diffraction light field, so that light fields having different wavelength in the target diffraction light field have the same spatial location distribution, or the light fields having different wavelength in the target diffraction light field have the same spatial angle distribution.

3 Claims, 3 Drawing Sheets

LIGHT CONTROL DEVICE

CROSS-REFERENCE TO RELATED APPLICATION

This application claims the priority benefit of China application serial no. 201811281627.3, filed on Oct. 31, 2018. The entirety of the above-mentioned patent application is hereby incorporated by reference herein and made a part of this specification.

BACKGROUND OF THE INVENTION

1. Field of the Invention

The present invention belongs to the field of light control and the field of holographic imaging, particularly relates to the field of computer-generated holography imaging and the field of light wave front modulation, and more particularly relates to a light control device.

2. Description of Related Art

Light control refers to control over light field distribution, including amplitude and phase of light. Common light control methods include a galvanometer, a Digital Micromirror Device (DMD), a Spatial Light Modulator (SLM), an electro optical deflector, and an Acousto Optical Deflector (AOD), etc. The light control is very widely applied to the fields such as laser marking, laser cutting, laser welding, projection, and photosensitive 3D printing, etc.

The light control methods can be divided into four types: a reflection type, a refraction type, a projection type, and a diffraction type. The reflection type is a common light control method such as a galvanometer used in laser processing, that is, a manner of rotating a reflecting mirror to change direction of a beam. The refraction type light control is used for controlling the properties of light by changing the refraction properties. For example, it can be a liquid varifocal lens which is a refraction type lens capable of changing a focal length by changing a surface type thereof. For another example, it can also be an electro optical deflector which deflects a beam by changing a refractive index. The projection type is also a common light control method. For example, a projector adopts a method for modulating the distribution (mainly intensity distribution) of an illumination light and then projecting the distribution to a certain region in space by means of an imaging conjugation relationship. The diffraction type is used for light control in a diffraction manner. In this case, a diffraction screen can be equivalent to be a hologram such as an acousto optical deflector having a diffraction screen in the type of Bragg grating. When an incident light is a collimating light, an emergent field thereof is a collimating light in a certain direction satisfying a grating equation.

The reflection type and retraction type light control methods are advantageous in simple control and disadvantageous in limited degree of freedom for control, which generally can only change the direction and focal power of light. The projection type can randomly control the intensity distribution of light, that is, can generate random pattern, but mainly has two limitations: 1) only light intensity distribution at the position conjugated with a projection screen can be controlled; 2) only a small amount of energy is allocated to each point within a projection range, and assuming that an illumination light is even and number of pixel points is N, only 1/N of energy is allocated to each point. The diffraction type presents different advantages and disadvantages according to the difference of specific devices. For example, an acousto optical deflector is advantageous in high speed and disadvantageous in high cost, only the direction and focal power of light can be changed and the efficiency is lower than that of the reflection type. The diffraction type beam control dominated by a spatial light modulator or a digital micromirror device is advantageous in that the speed is high, the intensity and phase distribution of light can be randomly controlled, and the light energy utilization can be much higher than that of the projection type during the generation of a pattern. For example, when it is only intended to generate one point, the projection type can only acquire 1/N of light energy. Only one two millionth of light energy can be obtained for a single point of a typical high-definition projection chip (number of pixels being 1920×1080), and the diffraction efficiency of the diffraction type is much higher than this value.

The current diffraction type light control method has not been mature yet technically, which is mainly presented as high complexity of a light path system, and high quality requirement on an illumination beam, etc. Furthermore, most of the existing diffraction type light control methods are only applicable to monochromatic light, quasi-monochromatic light or narrow band light. Since the diffraction has a dispersion effect, when light having different wavelengths is diffracted by the same diffraction screen, the light field distributions are formed differently. Femtosecond laser has an extremely high instantaneous power, interacts with materials in a different manner from traditional continuous or long pulse laser, and has unique advantages such as high precision and low thermal effect in subtractive processing, additive processing and other processing modes (welding, surface treatment, etc.). However, the femtosecond laser is narrow band light, which has a line width of 10 nanometer scales. The existing diffraction type light control methods cannot be well applied to the femtosecond laser.

Therefore, how to achieve broadband light (e.g., femtosecond laser) diffraction type light control is a technical problem to be urgently solved at present.

SUMMARY OF THE INVENTION

For the foregoing defects in the prior art or improvement requirements, the present invention provides a light control device, which hereby solves the technical problem that an existing diffraction type light control method cannot be well applied to broadband light diffraction type light control.

To achieve the foregoing objectives, the present invention provides a light control device including a light modulation module and a dispersion compensation module. The light modulation module is used for modulating an incident light field to obtain a target diffraction light field. The dispersion compensation module is used for performing dispersion compensation on the target diffraction light field, so that light fields having different wavelength in the target diffraction light field have the same spatial location distribution, or the light fields having different wavelength in the target diffraction light field have the same spatial angle distribution.

Preferably, the dispersion compensation module includes: a first lens group and a second lens group being placed in sequence, the first lens group and the second lens group constituting a Keplerian telescope structure.

Preferably, a focal length of the first lens group and a focal length of the second lens group satisfy following relationship within a target wavelength range:

$$\frac{f_{front}}{f_{rear}} \propto \frac{1}{\lambda},$$

where $f_{front}$ is the focal length of the first lens group, $f_{rear}$ is the focal length of the second lens group, and $\lambda$ is a light wavelength.

Preferably, the first lens group is presented as a negative chromatic aberration, and as a wavelength passing through the first lens group is longer, the focal length of the first lens group is shorter.

Preferably, the second lens group is presented as a positive chromatic aberration, and as a wavelength passing through the second lens group is longer, the focal length of the second lens group is longer.

In general, compared with the prior art, the foregoing technical solutions conceived by the present invention can achieve following beneficial effects. A light modulator is used to constitute a digital hologram, of which a diffraction field is controlled, so as to obtain a flexible light control means, and then the dispersion compensation module is used to solve the dispersion compensation of a hologram, thereby overcoming the limitation of an existing dispersion compensation technology that compensates only grating dispersion.

DESCRIPTION OF THE EMBODIMENTS

In order to make the objectives, technical solutions and advantages of the present invention clearer, the present invention is further described in detail with reference to the accompanying drawings and embodiments. It should be appreciated that specific embodiments described herein are only used to explain the present invention instead of limiting it. In addition, the technical features involved in various implementations of the present invention described hereinafter can be combined with each other only if there is no conflict.

The terms "first" and "second", etc. in the description and claims of the present invention are used to distinguish different objects instead of describing a specific order.

Figure 1:
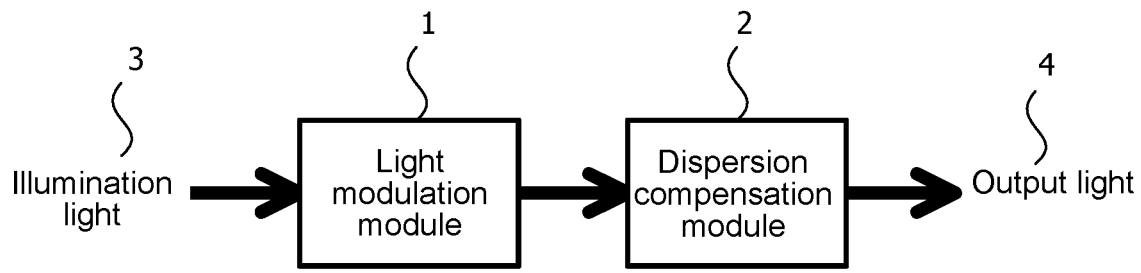
FIG. 1 is a structural schematic diagram of a light control device provided by an embodiment of the present invention.

FIG. 1 shows a structural schematic diagram of a light control device provided by an embodiment of the present invention. The device as shown in FIG. 1 includes a light modulation module 1 and a dispersion compensation module 2. An incident illumination light 3 is converted to an output light 4 after passing through the device.

In the embodiment of the present invention, the foregoing light modulation module 1 is used for modulating an incident light field. In this case, the light modulation module 1 is a diffraction screen, which can be equivalent to a hologram, a diffraction field thereof, namely an output light field, is represented as a needed light field.

For example, when a modulation function of the light modulation module 1 is a grating type, the output light field is a collimating light propagated to one or more specific directions, and when the modulation function of the light modulation module 1 is a secondary phase distribution, the output light field is a converging or diverging spherical wave. Theoretically, any output light field distribution satisfying Maxwell's equations can be achieved by the modulation of the light modulation module 1 through a method of computer-generated holography. A needed output light field can also be achieved by the aid of a focusing lens added before output as necessary.

In the embodiment of the present invention, a core device of the foregoing light modulation module 1 is a device capable of modulating the intensity or phase distribution of light, such as a Digital Micromirror Device (DMD), an Acousto Optical Deflector (AOD), or a Spatial Light Modulator (SLM).

In the embodiment of the present invention, the foregoing dispersion compensation module 2 is used for performing dispersion compensation on the light field modulated by the light modulation module 1, so that light fields having different wavelength in the light field modulated by the light modulation module 1 have the same spatial location distribution or the same spatial angle distribution.

Figure 2:
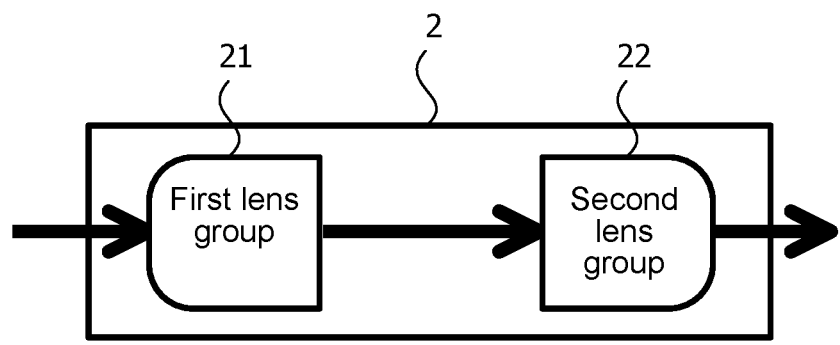
FIG. 2 is a structural schematic diagram of a dispersion compensation module provided by an embodiment of the present invention.
Figure 3:
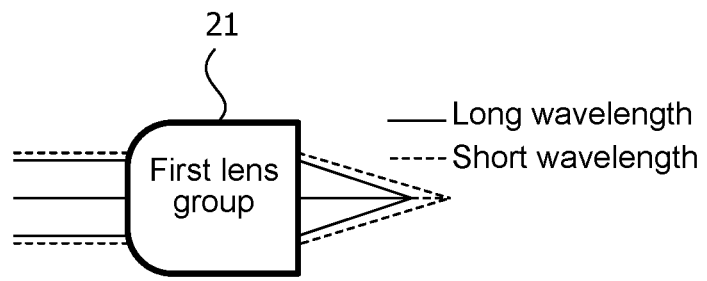
FIG. 3 is a schematic diagram of a front lens group of a dispersion compensation module provided by an embodiment of the present invention.
Figure 4:
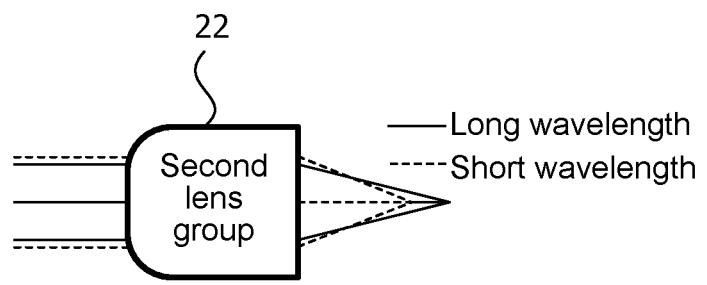
FIG. 4 is a schematic diagram of a rear lens group of a dispersion compensation module provided by an embodiment of the present invention.

In the embodiment of the present invention, a structure of the dispersion compensation module 2 is as shown in FIG. 2. The dispersion compensation module 2 includes a first lens group 21 and a second lens group 22 being placed in sequence. The first lens group 21 and the second lens group 22 constitute a Keplerian telescope structure. The first lens group 21 is presented as a positive lens with a negative chromatic aberration, and as a wavelength is longer, a focal length is shorter, as shown in FIG. 3. The second lens group 22 is presented as a positive lens with a positive chromatic aberration, and as a wavelength is longer, a focal length is longer, as shown in FIG. 4.

In the embodiment of the present invention, a focal length $f_{front}$ of the first lens group and a focal length $f_{rear}$ of the second lens group approximately satisfy a relationship $$\frac{f_{front}}{f_{rear}} \propto \frac{1}{\lambda}$$

within a target wavelength range, where λ is a light wavelength.

According to the design of a diffraction type light control device in the present invention, the principle is as follows.

Diffraction type light control is used for controlling the light distribution of a diffraction field by modulating a light field through a light modulator. A space rectangular coordinate system is established in space, directions x, y and z that are orthogonal pairwise are defined, and under paraxial far-field conditions, according to the Fraunhofer diffraction theory, a diffraction process can be written as:

$$I(f_x, f_y) = I(f_x, f_y) * T(f_x, f_y) \quad (1)$$

Wherein, $f_x$ and $f_y$ are space frequencies of the directions x and y, $U(f_x, f_y)$ is a far-field distribution after diffraction, $I(f_x, f_y)$ is a frequency spectrum of an illumination light, $T(f_x, f_y)$ is a modulation function of a diffraction screen on a frequency domain, and * represents a convolution operation. Also:

$$T(f_x, f_y) = \mathcal{F}[t(x, y)]\Big|_{f_x = \frac{\sin\theta_x}{\lambda}, f_y = \frac{\sin\theta_y}{\lambda}} \quad (2)$$

Wherein, t(x, y) is a transmittance function of a diffraction screen on a space domain.

For the sake of simplicity, the illumination light is two beams of light having the same incident angle and the wavelengths of $\lambda_1$ and $\lambda_2$. In general, assuming that the two beams of light are only inclined in the direction x, then:

$$I_1 = A_1 \delta\left(f_x - \frac{\sin\alpha}{\lambda_1}, f_y\right) \quad (3)$$

$$I_2 = A_2 \delta\left(f_x - \frac{\sin\alpha}{\lambda_2}, f_y\right) \quad (4)$$

Wherein, $A_1$ and $A_2$ are amplitudes of the two beams of light, and α is an included angle between an incident light in a plane xz and an axis z.

The frequency spectrum on the diffraction screen can be written as:

$$U_1(f_x, f_y) = A_1 \delta\left(f_x - \frac{\sin\alpha}{\lambda_1}, f_y\right) * T(f_x, f_y) \quad (5)$$

$$U_2(f_x, f_y) = A_2 \delta\left(f_x - \frac{\sin\alpha}{\lambda_2}, f_y\right) * T(f_x, f_y) \quad (6)$$

Wherein, δ represents a Dirac function, and for any function g(x, y), there is:

$$g(x,y) * \delta(x-s, y-t) = g(x-s, y-t) \quad (7)$$

By using the properties of the Dirac function in Formula (7), Formulas (5) and (6) can be written as:

$$U_1(f_x, f_y) = A_1 T\left(f_x - \frac{\sin\alpha}{\lambda_1}, f_y\right) \quad (8)$$

$$U_2(f_x, f_y) = A_2 T\left(f_x - \frac{\sin\alpha}{\lambda_2}, f_y\right) \quad (9)$$

It is assumed that $\theta_x$ and $\theta_y$ are included angles between the direction of light propagation in plane xz and plane yz and an axis z. Formula (8) is rewritten into a form where $\theta_x$ and $\theta_y$ are independent variables (assuming that $\theta_x$, $\theta_y$, α≪1):

$$U_1'(\theta_x, \theta_y) = A_1 T_1'(\theta_x - \alpha, \theta_y) \quad (10)$$

Wherein, $$U_1'(\xi, \eta) = U_1\left(\frac{\xi}{\lambda_1}, \frac{\eta}{\lambda_1}\right) \quad (11)$$

$$T_1'(\xi, \eta) = T\left(\frac{\xi}{\lambda_1}, \frac{\eta}{\lambda_1}\right) \quad (12)$$

Likewise, $$U_2'(\xi, \eta) = U_2\left(\frac{\xi}{\lambda_2}, \frac{\eta}{\lambda_2}\right) \quad (13)$$

so, $$U_2'(\theta_x, \theta_y) = A_2 T_1'\left(\frac{\lambda_1}{\lambda_2}(\theta_x - \alpha), \frac{\lambda_1}{\lambda_2}\theta_y\right) \quad (14)$$

Formula (10) and Formula (14) are compared to obtain:

$$U_2'(\theta_x, \theta_y) = \frac{A_2}{A_1} U_1'\left(\frac{\lambda_1}{\lambda_2}(\theta_x - \alpha), \frac{\lambda_1}{\lambda_2}\theta_y\right) \quad (15)$$

The physical significance of Formula (15) is that the angle distribution of a light field $\lambda_2$ (complex amplitude distribution of a light field at different angles) is scaling, for $\lambda_2/\lambda_1$, of the angle distribution of a light field $\lambda_1$ by centering on a direction (α, 0) under a paraxial approximation (i.e., $\theta_x$, $\theta_y$, and α≪1). From the conclusion, it is assumed that a perfect lens is placed behind a diffraction screen and on a focal plane of the perfect lens, the spatial distribution of a light field $\lambda_2$ is scaling, for $\lambda_2/\lambda_1$, of the spatial distribution of a light field $\lambda_1$ by centering on a focus point of a plane wave at an angle (α, 0) on the perfect lens focal plane.

The dispersion compensation module performs dispersion compensation based on the principle of angle magnification of a telescope, and an angle magnifying power of the telescope is a focal length ratio of a front lens group to a rear lens group. A focal length ratio of the first lens group to the second lens group of the dispersion compensation module is inversely proportional to a wavelength, and therefore the angle magnifying power of the dispersion compensation module can be expressed as:

$$M = \frac{\lambda_0 M_0}{\lambda} \quad (16)$$

Wherein, λ is a light wavelength, $\lambda_0$ is a certain specific wavelength, and $M_0$ is the angle magnifying power of the dispersion compensation module under $\lambda_0$. The dispersion compensation module is a Keplerian telescope system composed of two positive lens groups, and is also a 4ƒ system. An entrance pupil plane is defined as a front focal plane of the 4ƒ system, and an exit pupil plane is defined as a rear focal plane of the 4ƒ system. When in use, the diffraction screen is placed on the entrance pupil plane, and the optical axis of the dispersion compensation module is aligned with a zero dispersion direction (it should be a direction corresponding to an angle α in the absence of dispersion pre-compensation). Since angle magnification is scaling the angle distribution, the angle distributions of a light field $\lambda_1$ and a light field $\lambda_2$ on the exit pupil plane can respectively be:

$$U_1''(\theta_x, \theta_y) = U_1'\left(\frac{\lambda_1 \theta_x}{\lambda_0 M_0}, \frac{\lambda_1 \theta_y}{\lambda_0 M_0}\right) = A_1 T_1'\left(\frac{\lambda_1(\theta_x - \alpha)}{\lambda_0 M_0}, \frac{\lambda_1 \theta_y}{\lambda_0 M_0}\right) \quad (17)$$

$$U_2''(\theta_x, \theta_y) = U_2'\left(\frac{\lambda_2 \theta_x}{\lambda_0 M_0}, \frac{\lambda_2 \theta_y}{\lambda_0 M_0}\right) = A_2 T_1'\left(\frac{\lambda_1(\theta_x - \alpha)}{\lambda_0 M_0}, \frac{\lambda_1 \theta_y}{\lambda_0 M_0}\right) \quad (18)$$

In this case, the angle distributions of the light field $\lambda_1$ and the light field $\lambda_2$ on the exit pupil plane are the same, and only the amplitudes are different due to the difference of illumination light intensity. Therefore, diffraction dispersion is eliminated after passing through the dispersion compensation module.

Figure 5:
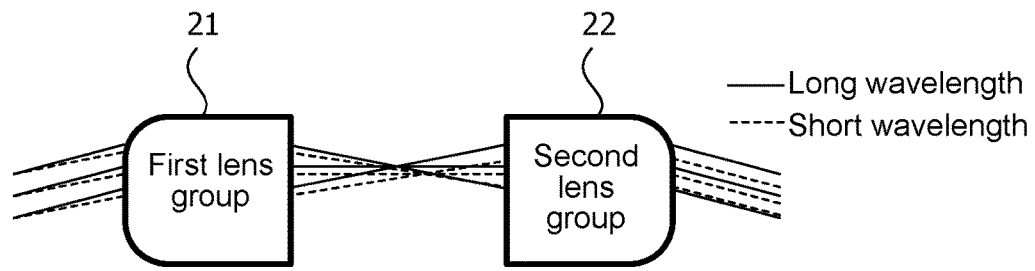
FIG. 5 is a functional schematic diagram of a dispersion compensation module provided by an embodiment of the present invention.
Figure 6A:
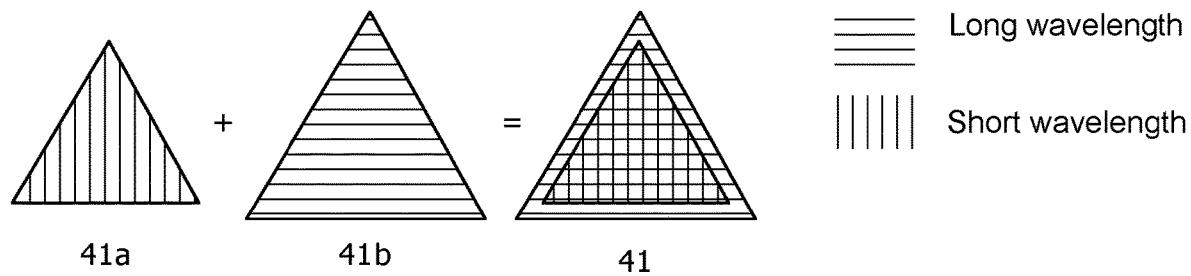
FIG. 6(a) is a schematic diagram of output light space distribution when the dispersion compensation module is not added.
Figure 6B:
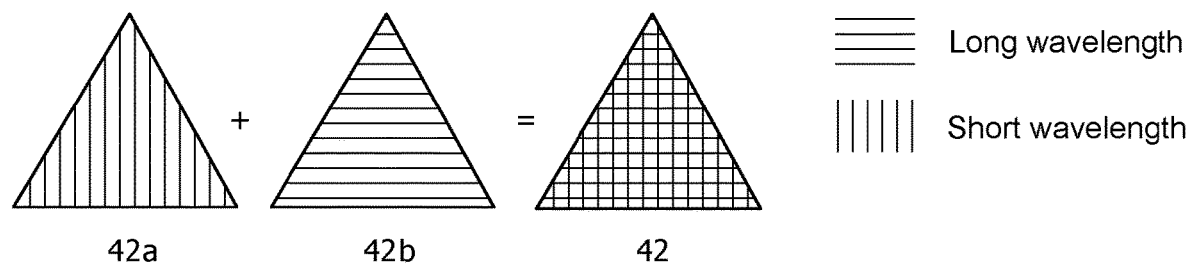
FIG. 6(b) is a schematic diagram of output light space distribution under the action of the dispersion compensation module, and any randomly distributed pattern is represented by a triangle in the figure.

FIG. 5 shows a schematic diagram of a dispersion compensation principle of a dispersion compensation module 2 according to an embodiment provided by the present invention. FIG. 6(a) and FIG. 6(b) show an effect schematic diagram of a dispersion compensation module 2 provided by an embodiment of the present invention. When there is no dispersion compensation module 2, output light fields having different wavelengths have different spatial location distributions. It is presented as that as the wavelength is longer, the dimension of a pattern is larger, as shown in FIG. 6(a). After being compensated by the dispersion compensation module 2, the spatial distributions of output light fields having different wavelengths are consistent, as shown in FIG. 6(b).

Figure 7:
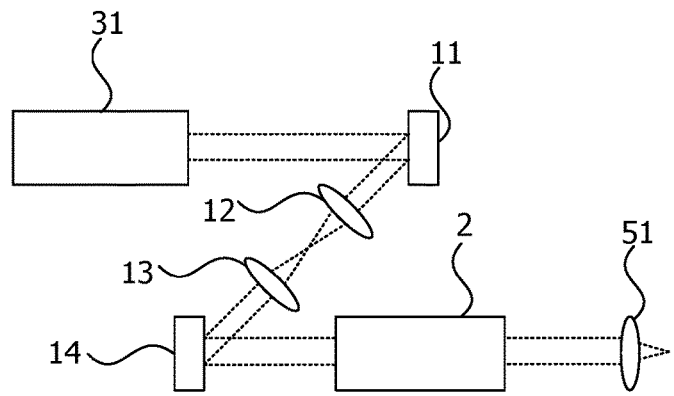
FIG. 7 is a structural schematic diagram of a light control device provided by a first embodiment of the present invention.

FIG. 7 shows a structural schematic diagram of a light control device provided by a first embodiment of the present invention. Light output by a femtosecond laser 31 is reflected by a reflection grating 11 (the reflection grating 11 is used for providing dispersion pre-compensation), is relayed by a lens 12 and a lens 13, is emitted to a digital micromirror device 14, and is modulated by the digital micromirror device 14. The modulated light passes through the dispersion compensation module 2, and then passes through a lens 51 to become an output light field.

Figure 8:
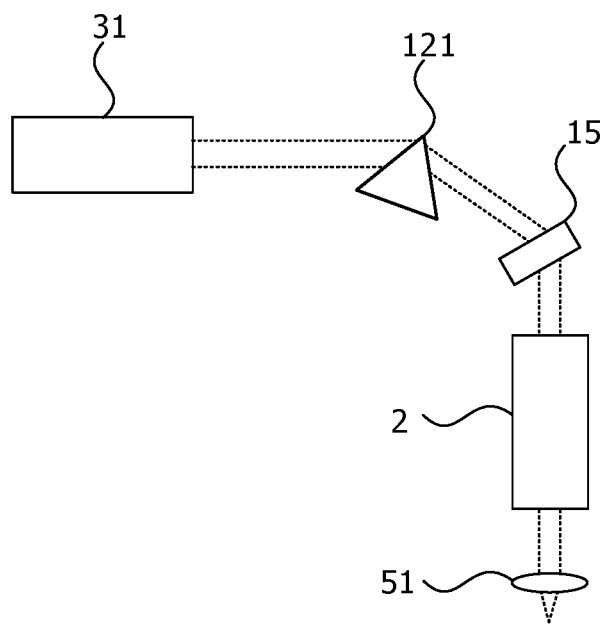
FIG. 8 is a structural schematic diagram of a light control device provided by a second embodiment of the present invention.

FIG. 8 shows a structural schematic diagram of a light control device provided by a second embodiment of the present invention. The light output by a femtosecond laser 31 is refracted by a prism 121 (the prism 121 is used for providing dispersion pre-compensation), is emitted to a biaxial acousto optical deflector 15, and is modulated by the biaxial acousto optical deflector 15. The modulated light passes through the dispersion compensation module 2, and then passes through a lens 51 to become an output light field.

Figure 9:
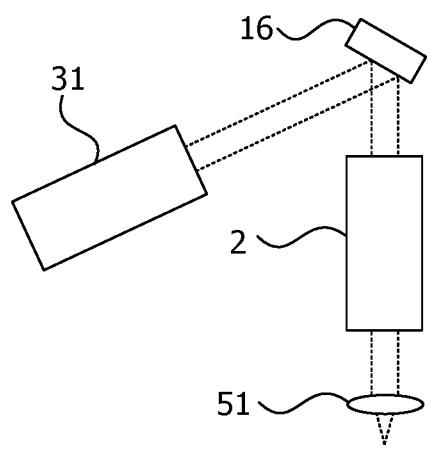
FIG. 9 is a structural schematic diagram of a light control device provided by a third embodiment of the present invention.

FIG. 9 shows a structural schematic diagram of a light control device provided by a third embodiment of the present invention. The light output by a femtosecond laser 31 is emitted to a phase modulation type spatial light modulator 16, and is modulated by the spatial light modulator 16. The modulated light passes through the dispersion compensation module 2, and then passes through a lens 51 to become an output light field.

Those skilled in the art can easily understand that the above description is only the exemplary embodiment of the present invention without limiting the present invention. Any modifications, equivalent replacements and improvements made within the spirit and principle of the present invention are intended to fall within the scope of protection of the present invention.

What is claimed is:

1. A light control device, comprising: a light modulator and a dispersion compensator, wherein
    the light modulator is configured to constitute a digital hologram and is used for modulating an incident light field to obtain a target diffraction light field; and
    the dispersion compensator is used for performing dispersion compensation on the target diffraction light field, so that light fields having different wavelength in the target diffraction light field have the same spatial location distribution, or the light fields having different wavelength in the target diffraction light field have the same spatial angle distribution,
    wherein the dispersion compensator comprises a first lens group and a second lens group being placed in sequence, the first lens group and the second lens group constituting a Keplerian telescope structure, and
    a focal length of the first lens group and a focal length of the second lens group satisfy following relationship within a target wavelength range:

$$\frac{f_{front}}{f_{rear}} \propto \frac{1}{\lambda},$$

where $f_{front}$ is the focal length of the first lens group, $f_{rear}$ is the focal length of the second lens group, and $\lambda$ is a light wavelength.

2. The device according to claim 1, wherein the first lens group is presented as a negative chromatic aberration, as a wavelength passing through the first lens group is longer, a focal length of the first lens group is shorter.

3. The device according to claim 1, wherein the second lens group is presented as a positive chromatic aberration, as a wavelength passing through the second lens group is longer, a focal length of the second lens group is longer.

* * * * *